United States Patent
Srinivasan

(10) Patent No.: US 6,460,076 B1
(45) Date of Patent: *Oct. 1, 2002

(54) PAY PER RECORD SYSTEM AND METHOD

(75) Inventor: Thiru Srinivasan, Highlands Ranch, CO (US)

(73) Assignee: Qwest Communications International, Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,549
(22) Filed: Dec. 21, 1998
(51) Int. Cl.$^7$ ................................................ G06F 13/00
(52) U.S. Cl. ...................... 709/219; 709/203
(58) Field of Search ................................ 709/219, 231, 709/329, 201, 202, 203; 711/218, 161, 154; 369/32, 47

(56) References Cited

U.S. PATENT DOCUMENTS

| | | | | |
|---|---|---|---|---|
| 5,572,442 A | * | 11/1996 | Schulhof et al. | 709/219 |
| 5,754,784 A | * | 5/1998 | Garland et al. | 709/219 |
| 5,796,945 A | * | 8/1998 | Tarabella | 709/219 |
| 6,011,761 A | * | 1/2000 | Inoue | 369/32 |
| 6,049,823 A | * | 4/2000 | Hwang | 709/218 |
| 6,055,566 A | * | 4/2000 | Kikinis | 709/219 |
| 6,070,228 A | * | 5/2000 | Belknap et al. | 711/118 |
| 6,154,773 A | * | 11/2000 | Roberts et al. | 709/219 |

* cited by examiner

Primary Examiner—David Wiley
(74) Attorney, Agent, or Firm—Marsh Fischmann & Breyfogle LLP

(57) ABSTRACT

An apparatus and method provides for the downloading and recording of data files over a data network such as the world wide web. A server connected to the world wide web includes a data base which includes a number of different data files such as music, video, and software that it wishes to sell to its customers. A web page is provided on the server for customers to access and view the products that are for sale. A system for billing the customers is also incorporated into the server such that when a system user logs in there is either a confirmation that the user has an account with the service provider or credit card information is provided in which charges may be made against. Through use of the web browser, the system user makes selections and begins the download of information into a memory in the user interface. Connected to the user interface is a recorder for recording the information upon a portable media such as an optical disk. Once the information is downloaded over the data network into the memory, the plugin in the web browser decompresses an unencrypts the file and begins the transfer process to the media recorder. Upon completion of the recording, (a) confirmation message is sent to the server (b) system user is billed for the download. After the billing process is complete, the plugin will delete the file from the computer memory and unlock the portable media so that the system user may play this information on another device.

17 Claims, 3 Drawing Sheets

PAY PER RECORD SYSTEM AND METHOD

FIELD OF THE INVENTION

This invention relates to a method and apparatus for downloading and recording multimedia files over a data network, and more particularly to a system which provides automated billing and copy protection for the multimedia files which are downloaded.

BACKGROUND OF THE INVENTION

The use of optical disks to store digital data is well known. Optical disks may be used to store a vast array of information which includes music and software on compact discs (CD's), and video on digital video discs (DVD's). In the past, these disks were of the "read only" type, which means that the information was permanently burned on the disc. Once the disc is created with information included thereon, the disc owner could not erase or otherwise copy information onto the disc. The discs are playable only in specially built read only devices.

In more recent times, technology has advanced such that a number of devices are now available for recording and playing information on specially constructed discs. These disks are now configurable such that information may be recorded upon it once, or it may be erased and re-recorded. Some examples of these types of recordable technology are CD-R (CD Record once), which is the type of disk which may be used to record only once. Many of these CD recorders are now available bundled in complete kits, including software. CD-ReWritable (CD-RW) is the type of disk which can be erased and recorded upon many times. The CDs created cannot be played in audio CD player, however these disks can be read in a multi read CD-ROM and CD-RW recorder.

DVD-Recordable (DVD-R) is a digital video disk which can be used to record only once. It is used to record production quality video and has a large capacity. Along these lines are also the DVD-Random Access Memory (DVD-RAM) which can be erased and recorded many times and also used to record audio and data. Finally one of the newer technologies is the DVD ReWritable wherein the disk may also be erased and recorded many times. It can be used to record audio, video and data.

Many of the players described above are able to connect to a personal computer. Software installed on the computer provides for the recording of the multimedia information upon the disc. Currently, information which is recorded on discs may be acquired from a number of sources. A first source is other forms of portable media from which information may be transferred through use of the computer from one disc to another. A second source may be the downloading of certain types of multimedia information from a data network such as the worldwide web. System users may access web sites and, after gaining access, download digital data and store it on a portable media.

SUMMARY OF THE INVENTION

The inventor has recognized that the functionality for recording on a portable media, such as a compact disk and a digital video disk, can be combined with the ability to remotely access and download information for recording on these disks through a data network. The applicants have further recognized that certain issues need to be dealt with in the downloading of such information, such as providing an automated billing process for charging customers who download information, and providing the necessary protections for the downloaded information so as to avoid unauthorized copying.

In the pay-per record system described herein, a service provider establishes a location on a data network such as the worldwide web, where customers may gain access. The location may be a website which includes number of web pages. These web pages may require a customer to enter authorization information in order to gain further access, and other web pages may include further information about multimedia data contained therein. The location may be a server which includes a database and an interface for credit authorization. Included in the database may be a number of different types of multimedia information, such as music and video information, or downloadable software.

As described above, a customer may establish contact with the website through the data network. In order to establish this connection, the customer may employ a user interface such as a personal computer equipped with a modem. Resident on the user interface is mechanism such as a web browsing software which the customer may use when accessing the service provider's web pages. Also resident on the customer's user interface is an area of memory which may be used to temporarily store multimedia files during the download. Connected to the user interface is a media recording device which upon command from the user interface, records the multimedia information upon a portable media. The portable media may include optical or other disc upon which the multimedia information may be recorded. The optical disc may include such things as recordable CDs and recordable DVDs. Once information is recorded upon these portable media, they may be removed from the media recorder and played upon a remotely located media playing device such as a compact disc player, or a digital video disc player.

Incorporated into the web browser on the user interface is a web browser plug-in which controls the processes performed during the download and transfer of multimedia files. This plug-in is compatible with any software installed on the user interface for recording information using the media recording device.

According to the method described herein, a customer employing the user interface with the web browser and plugin installed therein establishes a connection with the service provider's web site. As discussed above, the web site may include a number of web pages which may include a page which requires the customer to enter certain information such as membership authorization or credit card information in order to gain access. Once access is provided to the web site, a number of different web pages may be accessible by the customer upon which information is provided as to multimedia files contained in the database. After review of the listings, the customer will make a selection and the download process may begin.

In the situation where the customer enters a credit card or other information in order to download files, the server through an interface will use this information in order to gain a credit card authorization. Another situation the service provider may have established is a club, in which customers may be members and credit checks previously run. In these situations, the customer's account may then be billed. Once the download of the multimedia information is initiated, the plug-in of the web browser directs this information to be recorded on to a memory in the user interface. Prior to this download, the plugin may verify that a portable media has been loaded in the media recorder. Once the downloading of the file is complete, the plug-in or other software incorporated in the user interface may unencrypt or expand or otherwise convert data to a form which is recordable upon the portable media.

At this point, the plug-in may direct the transfer of the multimedia information stored on the memory onto the portable media. Once this transfer process is complete, an acknowledgment is received from the media recorder software upon which the plugin may provide the service provider via the data network with an acknowledgment that the recording and transfer was successful. Upon receipt of this acknowledgment, the service provider may then finish the billing process such that the customer's account is debited or a charge is made against the personal credit card. Once this billing process is complete, an acknowledgment is sent back to the web browser plug-in which in turn deletes the downloaded file from the user interface memory.

In one aspect of the invention, safeguards are incorporated into the system such that if any step fails, such as the transfer of the multimedia information to the portable media or the confirmation of the billing information, the plug-in is directed to delete the file from the memory. In other situations, the capability exists to delete the information recorded on the portable media prior to releasing it to the system user. A number of safeguards such as these described above may be incorporated into the plug-in in order to provide the necessary protection for making unauthorized copies.

DETAILED DESCRIPTION

Figure 1:
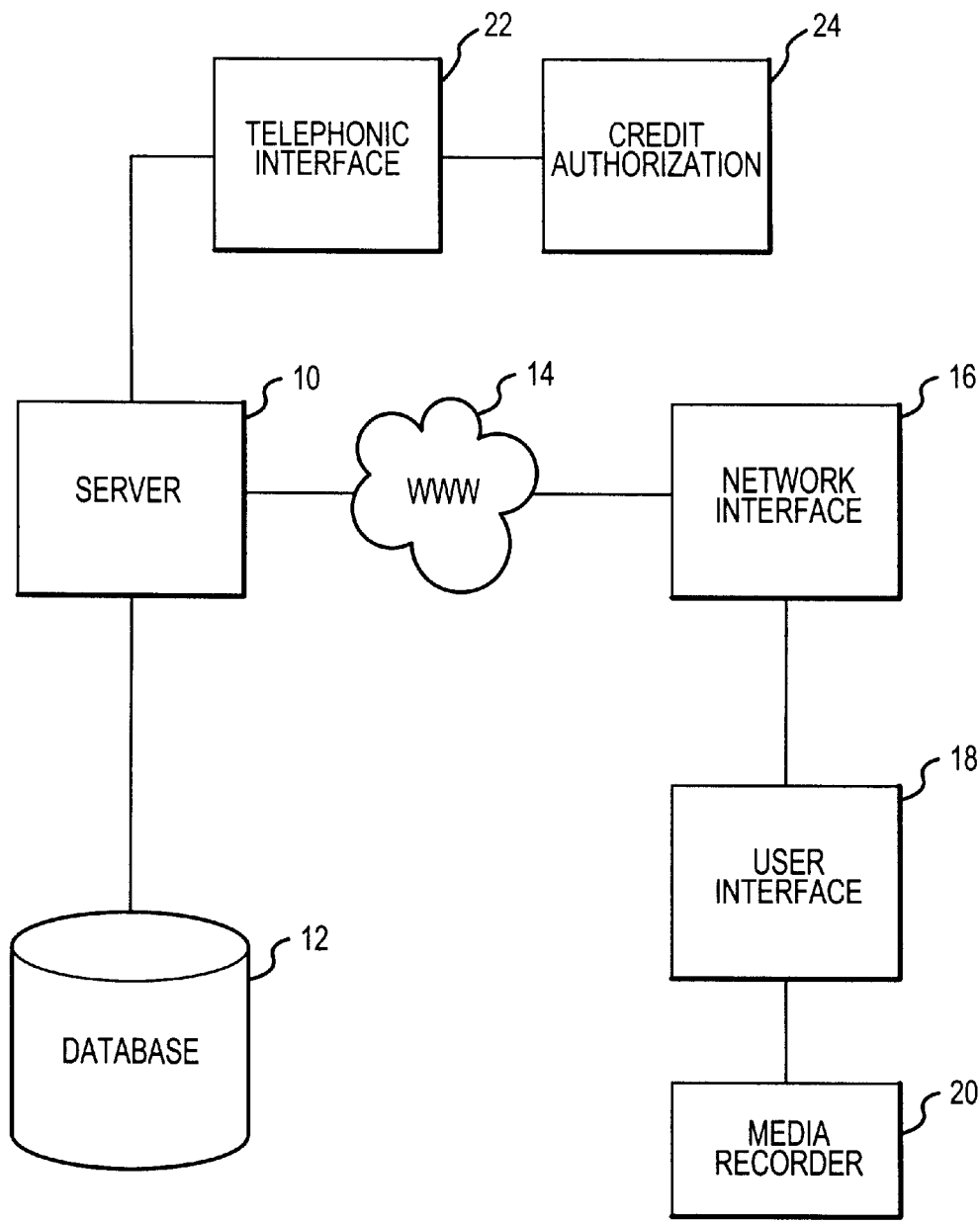
FIG. 1 discloses a system diagram for the pay-per record system.

Disclosed in FIG. 1 is a system diagram for the pay per record system. In the pay per record system, customer with access to a data network may access a particular location such as a web page, and download a variety of multimedia information. The system described herein, in addition to providing automated billing, includes the necessary functionality to avoid unauthorized copying of the downloaded information.

In an embodiment of the invention, data to be downloaded is provided by server 10 over the worldwide web 14. In connection with the server 10 is a database 12 which stores the music, video, and other data which is to be downloaded over the worldwide web 14. The server 10 includes a web page which a system user may access in order to make selections from the database. Also in connection with server 10 is telephonic interface 22. Through this telephonic interface, the server 10 may make contact with a credit authorization system 24 such as a credit card validation organization such that system users who enter their credit card information while ordering the download of information may be billed for the services.

Also in connection with the worldwide web 14 is the network interface 16. In most situations, this will be an Internet service provider through which remotely located system users may establish a contact with the data network. It is also conceivable that this may be a local area network server which has a backbone connection to the worldwide web. The system users establish contact with the network interface through a user interface 18 such as a personal computer equipped with a modem or an Ethernet Card.

Connected to the user interface 18 is a media recording device 20. This device may be any of a number of commercially available systems which record large amounts of electronic data on a portable media such as a floppy disk, recordable compact disk (CD), and recordable digital video disk (DVD). In most cases, these recording devices include their own software and work in conjunction with the operating system on the user interface.

In the system described herein, a service is provided to users of the worldwide web to download and record on portable media various types of multimedia information. Incorporated into the system are means to automatically bill a customer for a download and provide protections against unauthorized copying. This service provides the advantage that in a situation where a customer wishes to buy music, movies, or software, this purchase may be made and the product provided without ever leaving home.

In order to implement this system, the service provider hosting the server 10 will provide a web page that customers may access over the worldwide web. The customer may be a member of a club sponsored by the service provider or just wants to record something for a fee by providing the appropriate credit card information. Access to the server will only be provided upon proper authentication or verification of credit card information. Once access is gained to the website, a number of different pages are available for viewing by the customer in order to make a selection. The database 12 connected to the server may contain a number of transcripts of TV programs, computer data, video games, movies, and music premastered in a number of Universal Disk Format (UDF) formats. These data files in the database may also contain information related to the charges for the recording and the time it may take for the customer's user interface to record the data file on the memory in the user interface and then make the transfer to the media recorder employed by the system user.

Figure 2:
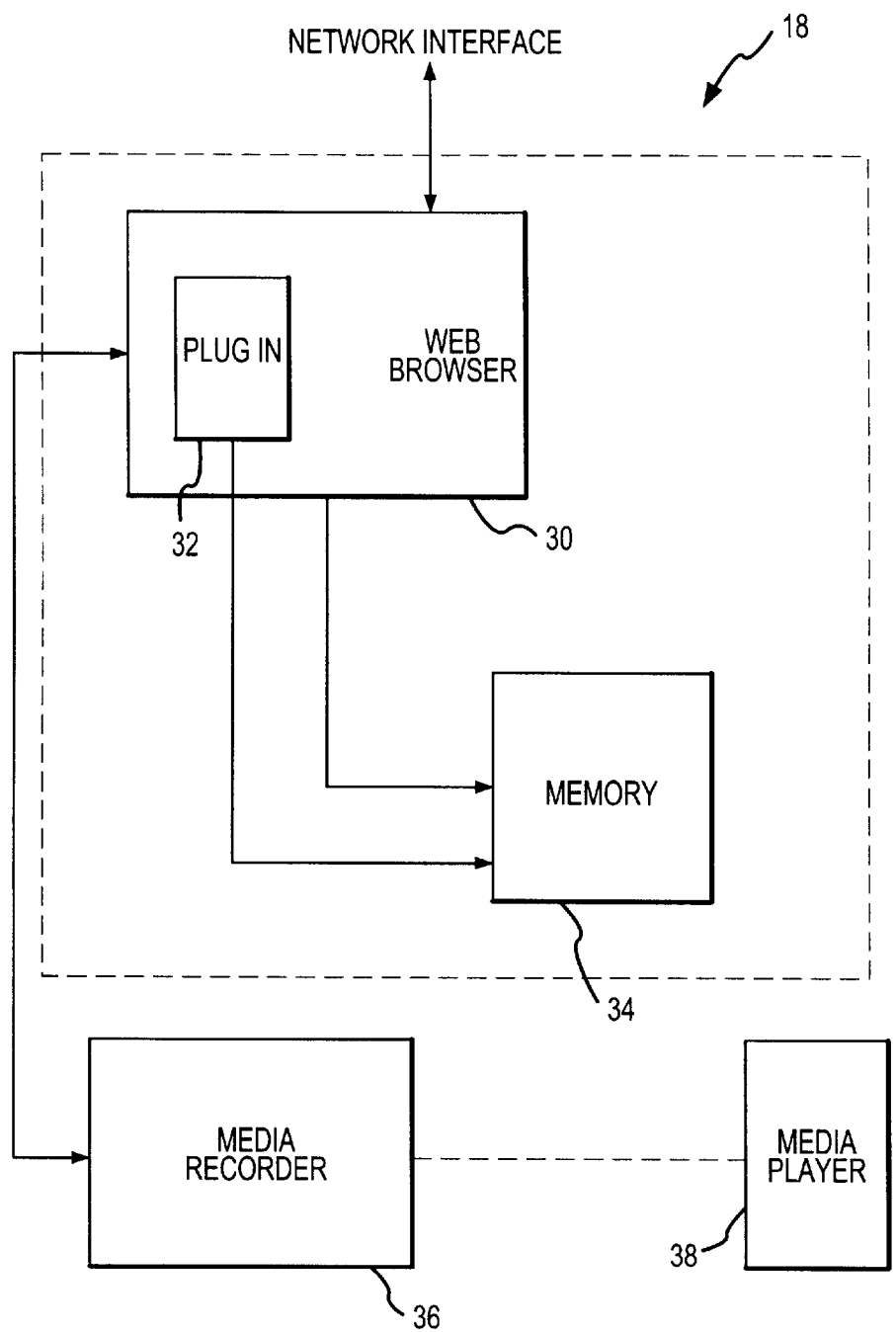
FIG. 2 discloses a system diagram for the user interface and the portable media recorder.

Disclosed in FIG. 2 is a system diagram of the internal components of the user interface as well as connections to external devices. In order for the customer to establish contact with the data network and the provider's website, a web browser 30 is installed in the user interface 18. The web browser 30 may be any one of a number of types which is commercially available (Netscape Navigator, Internet Explorer, . . . ). Included in the web browser is a plugin 32 specially designed to administer a number of the processes which will be described in greater detail below. Generally, this plugin will be provided by the service provider in order to monitor and provide the necessary notifications and other functions during and after the download process. Included in the user interface is memory 34 which, in one embodiment of the invention, may be a particular amount of space allocated on the user interface hard drive. Information which is downloaded from the worldwide web via the web browser 30 and plugin 32, is stored in this memory. Information stored in the memory 34 may be transferred to the media recorder under direction from the plugin. In situations where the multimedia information was downloaded in encrypted and/or compressed form, the plugin includes the functionality to convert the downloaded information to a standard format for recording.

The media recorder 36 provides for the recording of the multimedia media on some form of portable media. In one embodiment of the invention, the recorder 36 is configured to copy information on to recordable optical disks, such as compact discs (CD's) or digital video discs (DVD's). Some examples of recorders are: CD-Recordable (CD-R), which is the type of disk which may be used to record only once, CD-ReWritable (CD-RW) which is the type of disk which can be erased and recorded upon many times, DVD-Recordable (DVD-R) which is a digital video disk which can be used to record only once; DVD-Random Access Memory (DVD-RAM) which can be erased and recorded many times and also used to record audio and data, and DVD ReWritable where the disk may also be erased and recorded many times.

To begin the process for recording a data file, a system user will first mount a blank disk in the media recorder which may of any of the types described above. It is also possible that information may be downloaded onto a magnetic media such as a floppy disc. The customer, through the user interface and the web browser incorporated therein, then establishes a connection with the worldwide web and accesses the server 10. At this point a new session is started, and the server will generate a session ID which is passed to the browser as a hidden field. The session ID will be stored in the server against a member ID or credit card information for later billing. A time out mechanism may also be employed at the server to disconnect the session if no request is initiated by the system user within a predefined time period. Once the session has begun, the system user is provided with a web page which includes a number of selections for downloading information. For example, on a first web page the system user may be given the option to choose between a number of different types of data which may include software, music, movies, or other computer data. The system user at this point would then select a particular type of data at which time access would be granted to another web page which would include a listing of items which may be downloaded. At that point the customer may make a selection.

Upon selection of the desired item, the web browser plugin will, via the software incorporated into the media recorder, confirm that the media is loaded in the recorder. If a disk is not mounted, an error message will be displayed on the user interface notifying the customer that a disk needs to be inserted into the drive. In most situations, these media recording devices have their own software incorporated therein and are compatible with the web browser plugin.

Once the driver software and the recording device indicates its readiness via a message to the plugin, the plugin will delete any hidden temporary files from any previous recordings and then send a request to download the desired data from the server. This request may include some of the following information, session ID, type of user interface which the customer is employing (i.e. a Pentium 133 Mhz or a Pentium-II 300 MHz) and the model and make of the recording device. If none of these devices is compatible for the download the server will reject the request by sending an error message. If the request is accepted, the server will locate the data file in the database and then begin transmission over the Worldwide Web using the file transfer protocol (FTP).

The web browser plugin will receive the data file over the data network and store it in a hidden temporary file in the memory residing in the user interface. In order to save time during download and to protect the security of the information, in most cases the information would be downloaded in a compressed form. It may also be encrypted. A number of other schemes may be used in place of the hidden temporary file mechanism in order to provide sufficient security for unauthorized copying. A first method is to eliminate the "Save As" function from any "movie player" applications. A second mechanism would be to modify the computer's basic operating system, such that it will recognize Multimedia data and prevent copying by any application running on the computer. Finally, a third mechanism is to arrange the computer hardware such that the Multimedia data never flows over the main bus (PCI Bus), which prevents it from being decrypted by the CPU and recorded on a hard disk or tape. The system may also be potentially more efficient by keeping both compressed and uncompressed multimedia data from overloading the PC's main bus.

Once the entire data file has been downloaded to the user interface, the server will begin the "recording timer" based on information provided by the web browser plugin related to the type of user interface, the type of media recorder and the size of the data downloaded. This timer ensures that the plugin will send a "recording successful" message at the end of the recording process. Once the entire data file is downloaded and stored in the hard drive, the plugin will send a message to the recorder driver software to start the recording process. At this time, the temporary file in memory 34 will be uncompressed and unencrypted. The media recorder driver software will then be provided with the name of the hidden temporary file stored on the hard drive and the driver software will then transfer the contents of the hidden temporary file to the portable media. Upon completion of the recording process, the driver software will notify the web browser plugin of the completion of the recording process. The plugin will in turn provide the server with a "recording successful" message indicating that the transfer was successful. At this point, the server will stop the "recording timer" and initiate the billing procedures for the charges associated with the download of data and once this is complete, send a positive acknowledgment to the web browser plugin. Upon receipt of the acknowledgment message, the web browser plugin will delete the hidden temporary file and inform the media recorder software to unlock the portable media. Thereafter, the plugin will display a message on the customer's desktop indicating the successful completion of the recording and the system user may log out of the server.

If the acknowledgment is not received within a specified time interval, the plugin will retransmit a recording successful message. The retransmission may be done up to a predetermined number of times. If the acknowledgment message is not received by the plugin after these attempts, the plugin will delete the hidden temporary file and issue a command to the media recorder driver software to erase the portable media.

The following are a number of error scenarios which may happen during the course of the recording process but which are handled by the web browser plugin. In case the portable media is removed from the recorder during the recording process, the recorder driver software will identify this and notify the plugin. The plugin will then display a message to the customer indicating that the recording is being terminated. Thereafter, the plugin will delete the hidden temporary file and send a "recording failure" message to the server. The server will not initiate any billing procedures. The server will send a negative acknowledgment to the browser indicating the receipt of the "recording failure" message. If the negative acknowledgment is not received within a specified time, the plugin will retransmit the recording failure message.

If the customer tries to shut down the browser during the recording process, the plugin will display a message indicating that a recording is in progress. The customer will be asked to verify whether he/she wants to shut down the browser. If the customer chooses to shut down the browser, the plug-in will delete the hidden temporary file and issue a command to the media recorder driver software to stop recording and then transmit a "recording failure" message to the server. Upon receipt of the recording failure message, the server will not initiate any billing procedures. The server will then transmit the negative acknowledgment to the browser indicating the "recording failure".

In the situation where the network interface, a/k/a the Internet service provider, shuts down, the plugin will display a message indicating that the recording is being terminated. Thereafter, the pay-per record plugin will delete the hidden temporary file, and the server will disconnect the session and not issue any billing procedures.

In the case of a user interface power outage, the hidden temporary file will be deleted when the recording process is initiated at a later time. If a time out occurs on the server side due to expiration of the "recording timer", then the server will disconnect the session and not initiate any billing procedures. Upon the session termination, the plugin will delete the temporary hidden file, erase the portable media, unlock the portable media, and display an error message on the customer's desktop.

Figure 3:
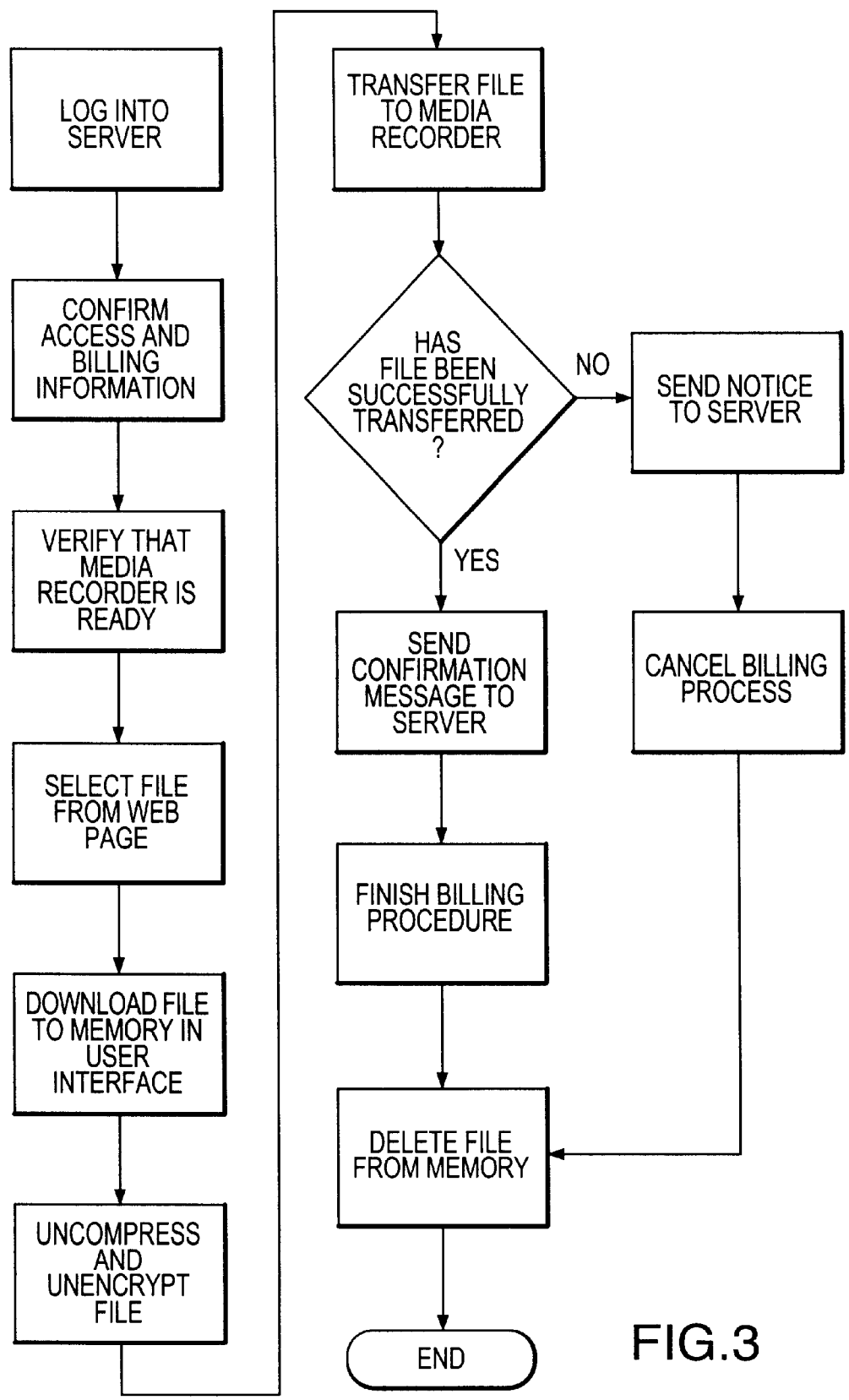
FIG. 3 discloses a flow chart which describes in detail the operation of the pay-per record system.

Disclosed in FIG. 3 is a system diagram describing the operation of the server plugin. Under direction of the customer, the web browser and web browser plugin establish a connection over the data network with the server. At this point, information is exchanged and the server confirms that system user is either a member, has some affiliation with the business or has provided credit card information from which a credit check may be performed. Once this preliminary check is performed, a recording session may begin and the plugin confirms that the media recorder has portable media loaded therein and is ready to begin recording.

At this point, the server provides the selections to the system user and through the web browser the system user selects the file to be downloaded. Once the file has been selected, the down load process begins by transmitting the compressed encrypted file from the memory in the server to the memory on the hard drive of the user interface. At this point the operating system of the user interface under direction from the plugin decompresses and unencrypts the file. At this point, the transfer between the memory and the portable media is begun.

The plugin continually monitors the transfer of data from the hidden temporary file in memory to the disk. If for any reason there is an interruption in this process, the plugin sends a message to the server indicating that the recording was not successful. At this point the server will cancel the billing process and the plugin will delete the downloaded hidden temporary file.

If the transfer is successful, a confirmation message is sent to the server indicating that the transfer of data to the media was successful. Upon receipt of this confirmation of this information, the server completes the billing process and either debits the system user's account or makes a charge against the credit card account. Upon receipt of an acknowledgment from the server, the plugin will then delete the data file from the memory and unlock the portable media upon which the information is recorded for the system user.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An apparatus for downloading and recording selected multimedia data over a data network comprising:
    a personal computer connectable to the data network said personal computer comprising:
        a web browser with plug-in resident on the personal computer and configurable to connect to the data network such that at least one location on the data network may be accessed and at least one data file selected and downloaded;
        a memory in connection with the data network access device which configurable to receive and store the at least one data file;
        a recording device which under direction from plug-in of the web browser accesses the at least one data file in the memory and records the at least one data file on a portable media, wherein upon the successful recording of the multimedia data upon the portable media, the plug-in provides indication to the location and the at least one data file is automatically deleted from the memory; and
        said web browser plug in is further configured to monitor and provide status information to the at least one location for the recording of the at least one data file in the memory and upon the portable media, and to include access information during the recording which controls access to the at least one data file as recorded on the portable media.

2. The apparatus of claim 1 wherein the data network access device further comprises a billing module which performs automated billing functions upon the successful recording of the multimedia data upon the portable media.

3. The apparatus of claim 1 wherein the at least one data file may include at least one of: audio information, video information, and software.

4. The apparatus of claim 1 wherein the portable media comprises at least one of: CD-Recordable, CD-ReWritable, DVD-Recordable, DVD-RAM, and DVD-ReWritable.

5. The apparatus of claim 1 wherein the at least one location is a web page which includes a least one listing of the at least one data file.

6. The apparatus of claim 1 wherein the plug in is further configured to include locking and unlocking functions with regards to the portable media.

7. The apparatus of claim 1 wherein the plugin further includes functionality to unencrypt and decompress the at least one data file received from the at least one location.

8. The apparatus of claim 6 wherein the plug in includes functionality to delete the at least one data file from the memory and the portable media upon interruption ofthe receiving of the at least one data file from the at least one location.

9. A method of employing a web browser in a personal computer to download multimedia data over a data network comprising:
    installing a specially configured plug in the web browser for initiating and controlling the downloading and copying of the multimedia data;

establishing a connection from the personal computer using a web browser with plug-in with at least one location over the data network;

accessing at least one data file resident at the at least one location;

initiating and performing a download of the at least one data file over the data network to a local memory;

copying the at least one data file from the memory and recording the at least one data file on a portable media, wherein the recording includes access information which controls access to the at least one data file on the portable media;

periodically providing status information to the at least one location for the recording of the at least one data file in the memory and upon the portable media, and to include access information during the recording which controls access to the at least one data file as recorded on the portable media; and upon completion of the recording of the at least one data file on the portable media, deleting the at least one data file from the memory.

10. The method of claim 9 wherein the at least one data file is accessible through use of a web page incorporated into a network server.

11. The method of claim 9 further including the step of providing information for a party requesting access to the at least one data file and performing an authorization check on prior to providing access to the at least one data file.

12. The method of claim 11 further including the step of automatically billing the party upon successful transfer of the at least one data file to the portable media.

13. The method of 9 further including the step of deleting the at least one data file from the memory and the portable media if the transfer of the at least one data file to the portable media is unsuccessful.

14. The method of claim 13 further including the step of automatically deleting the multimedia data from the memory if the portable media is inaccessible for the transfer of the at least one data file.

15. The method of claim 13 further including the step of automatically providing notification to the party relating to progress of the download and the transfer of the at leasat one data file.

16. The method of claim 13 further including the step of automatically deleting all portions of the at least one data file from the memory and the portable media if the downloading and/or recording of the at least one data file is interrupted.

17. The method of claim 12 further including the step of denying access to the portable media during the steps of downloading and recording the at least one data file, and providing access to the portable media upon completion of the automated billing process.

\* \* \* \* \*